Patented Feb. 16, 1954

2,669,525

UNITED STATES PATENT OFFICE 2,669,525

BITUMEN AND POLYVALENT METAL HYDROCARBON OIL SULFONATE COMPOSITION AND PROCESS OF MAKING SAME

David W. Bransky and John A. Bolt, Chicago, Ill., Maurice W. Stacy, Valparaiso, Ind., and Morris Feller, Chicago, Ill., assignors to Standard Oil Company, Chicago, Ill., a corporation of Indiana No Drawing. Application August 3, 1949, Serial No. 108,428

18 Claims. (Cl. 106—278)

This invention relates to a method of preparing a stabilized polyvalent sulfonate composition and to bituminous compositions containing the same, and more particularly relates to a method of preparing a stable composition containing a calcium sulfonate derived from sulfuric acid sludge, and to bituminous materials containing said stable composition.

Bituminous materials, such as normally liquid road oils and normally liquid to normally solid asphalts, are frequently compounded with various adjuncts to improve the adhesiveness of such materials to wet mineral aggregates. Among the various adjuncts employed for this purpose are soaps of sulfonic acids, particularly the alkaline earth metal and heavy metal soaps of sulfonic acids obtained in the treatment of hydrocarbon oils with concentrated or fuming sulfuric acid. One source of such sulfonic acids is the acid sludge obtained in the treatment of hydrocarbon oils with sulfuric acid of about 98% strength, and preferably fuming sulfuric acid. Usually the sulfonic acids are extracted from the acid sludge, and then converted to the sulfonates.

It is an object of the present invention to provide a method of preparing soaps of sulfonic acids in situ in acid sludge.

Another object of the invention is to provide a method of preparing stable homogeneous metal sulfonates in situ in a hydrolyzed acid sludge resulting from the treatment of a hydrocarbon oil with sulfuric acid.

Still another object of the invention is to provide a method of preparing a stable homogeneous composition containing a metal sulfonate from hydrolyzed acid sludge resulting from the treatment of a hydrocarbon oil with sulfuric acid.

Another object of the invention is to provide a method of preparing a stable homogeneous composition containing calcium sulfonate from acid sludge obtained in the treatment of hydrocarbon oils with fuming sulfuric acid.

Another object of the invention is to provide a stable homogeneous bituminous composition containing a salt of sulfonic acids derived from hydrolyzed acid sludge resulting from the treatment of a hydrocarbon oil with sulfuric acid.

In accordance with the present invention a stable homogeneous composition containing a metal salt of sulfonic acids derived from acid sludge resulting from the treatment of hydrocarbon oils with sulfuric acid of at least about 95% strength, can be obtained by forming such metal sulfonates in situ in the hydrolyzed acid sludge in the manner hereinafter described. In preparing the sulfonate composition of the present invention the acid sludge is first hydrolyzed and settled to permit stratification of the weak sulfuric acid resulting from the hydrolysis. After withdrawing the sulfuric acid, the remaining portion of the acid sludge, commonly referred to as "liver," is diluted with water. It is important that the "liver" be sufficiently diluted with water at this point prior to the neutralization step, since in a properly diluted "liver" the metal sulfonate formed upon neutralization is preferentially precipitated rather than the metal sulfate thus resulting in a metal sulfonate of low inorganic salt content. The dilution required to prevent the preferential precipitation of the metal sulfate is dependent upon the concentration of sulfonic acid and sulfuric acid in the "liver." In general, the "liver" or separated hydrolyzed sludge should be diluted with more than about three volumes of water, and preferably at least five volumes of water for each volume of "liver." The diluted liver is then heated to a temperature of from about 90° F. to about 200° F., and preferably from about 120° F. to about 150° F., and the sulfonic acid neutralized with a suitable neutralizing agent such as for example an oxide, hydroxide or carbonate of the desired metal, for example, an alkaline earth metal, e. g., calcium, strontium, barium or a heavy polyvalent metal, e. g., lead, iron, zinc, copper, cobalt, manganese, etc., although the alkaline earth metals, particularly calcium are preferred. Other suitable neutralizing agents are basic nitrogenous compounds, such as for example, ammonia, toluidine, etc. The neutralizing agent is preferably added in the form of a slurry and the reacting mixture agitated, such as by air blowing to accelerate the reaction and prevent excessive settling of the neutralizing agent. After the desired amount of the neutralizing agent has been added, the precipitated metal sulfonate is allowed to settle and the supernatant liquid drawn off, the aromatic hydrocarbon of the type hereinafter disclosed is added to the crude sulfonate mixture in amounts of from about 25% to about 75% by weight, and preferably from about 35% to about 60% by weight. After the crude sulfonate and the aromatic hydrocarbon are well mixed, sufficient neutralizing agent is added to completely neutralize the residual acidity of the material. The neutralized mixture of sulfonate and aromatic hydrocarbon is dehydrated, i. e., dewatered to lower the water content to from about 1% to about 35%, and preferably from about 3% to about 10%.

The extent to which the neutralized product is dehydrated will depend to some extent upon the type of alcohol used. For example, when using alcohols of up to about five carbon atoms dehydration to a water content of from about 1% to about 10% is desirable, whereas when using higher alcohols, such as for example, nonyl alcohol, cetyl alcohol, etc., dehydration to a water content of about 35% will be sufficient to prevent phase separation. After the dehydrated mixture is cooled to a temperature of at least about 150° F. and the mixture diluted with from about 2% to about 15%, and preferably from about 4% to about 8% of the aliphatic alcohol, it is ready for storage, or for compounding with the bitumen material.

It is important that the finished mixture contain not more than the maximum amount of water indicated above since the presence of larger amounts of water will cause a phase separation of water, alcohol, and soap mixture from the aromatic hydrocarbon. However, when the amount of water present is maintained within the above-mentioned limits a stable homogeneous product is obtained.

The sulfonate composition obtained in the manner described contains essentially the following components in the following approximate proportions:

| | Range (Percent) | Preferred Range (Percent) |
|---|---|---|
| Metal Sulfonate | 10 to 50 | 20 to 50 |
| Aromatic Hydrocarbon | 25 to 75 | 35 to 60 |
| Aliphatic Alcohol | 2 to 15 | 4 to 8 |
| Water | 0 to 35 | 3 to 10 |
| Hydrocarbon Oil | 0 to 30 | 5 to 10 |

Aromatic hydrocarbons suitable for use in accordance with the present invention are preferably those having a boiling point above about 220° F. at atmospheric pressures and includes mono-nuclear aromatic hydrocarbons, such as the xylenes, and poly-nuclear or condensed ring aromatics, such as naphthalenes, alkylated naphthalenes, such as methylated naphthalenes and ethylated naphthalenes, and mixtures of the higher boiling mono-nuclear aromatic hydrocarbons and poly-nuclear hydrocarbons.

A preferred source of mixed aromatic hydrocarbons suitable for use in the present invention is a light catalytic cycle stock obtained from a powdered or fluid-type catalytic hydrocarbon cracking operation in which gas oil or heavier hydrocarbons, such as reduced crude, are cracked at a temperature of about 800° F. to 1050° F. at a pressure of about atmosphere to 50 pounds per square inch in the presence of suitable fluidized or powdered catalysts, such as for example, silica-alumina, silica-magnesia and other well-known cracking catalysts. A method of conducting a fluidized catalytic cracking operation is described in U. S. 2,341,193, issued to Fred W. Scheineman February 8, 1944. The fraction suitable for use in the present invention is a heavier-than-gasoline fraction usually recycled to cracking. These fractions, depending upon their boiling range, are commonly referred to as light cycle stock, heavy cycle stock and recycle residuum. A catalytic light cycle stock particularly well suited for this invention is a fraction having an aromatic content of at least about 40–50%, and a distillation range between about 425° F. and about 560° F. A typical analysis of a suitable light catalytic cycle stock shows the material to be composed substantially of about 10% normal $C_{12}$ to $C_{20}$ paraffins, about 45% of other paraffins and naphthenes, about 5% mono-nuclear aromatics which are mainly mono- to hexa-alkylated benzenes, and about 40% poly-nuclear aromatics which are mainly alkyl naphthelenes, largely methylated naphthalenes. A typical light catalytic cycle stock will give the following A. S. T. M. distillation:

Initial boiling point _____°F__ 430
   10% over_____°F__ 448
   50% over_____°F__ 478
   90% over_____°F__ 518
Maximum boiling point _____°F__ 552

While we prefer to use a light cycle stock from a catalytic cracking operation of the type above described, hydrocarbon fractions from other catalytic hydrocarbon conversion processes or thermal hydrocarbon conversion processes are suitable provided they have a sufficiently high aromatic content, at least 40–50 percent, and have suitable distillation characteristics, i. e. boiling above about 220° F.

In place of using the whole catalytic cycle stock we may extract the aromatic components from the cycle stock and use the aromatic extract. The aromatics may be extracted by extraction with the usual and known solvents, such as for example, liquid hydrogen fluoride, nitromethane, liquid sulfur dioxide, etc.

Other mixed aromatic hydrocarbons suitable for use in the present invention are mixtures of aromatic hydrocarbons produced by the catalytic conversion of aliphatic hydrocarbons by the so-called hydroforming process. This mixture is known in the petroleum refining art as "catalytic reform naphtha bottoms," "hydroformer polymers," or "hydroformer bottoms." They will be referred to hereinafter as "hydroformer polymers." A process by which the hydroformer polymers are obtained is described in U. S. Patent No. 2,320,147. Briefly, the process comprises treating virgin or cracked naphtha or mixtures thereof with a solid porous hydroforming catalyst such as an oxide of a metal of group II to IV of the periodic system, such as the oxide of chromium or molybdenum, suitably supported on alumina or magnesia. The conversion is suitably carried out at a temperature of 850° F. to 1050 F. and, if desired, in the presence of hydrogen. The hydroformer products are fractionated by taking overhead a catalytically reformed gasoline of suitable end point and recovering the higher boiling materials as bottoms, which boil from about 400° F. to about 750° F., and have gravities of from about 10° API to about 18° API. A typical vacuum distillation of a hydroformer sample having a gravity of about 12° API shows the following composition:

| Fraction | Components |
|---|---|
| 0–2% | Toluene. |
| 2–8% | Xylenes. |
| 8–14% | 1, 3, 5-Trimethylbenzenes. |
| 14–17% | 1, 3, 4-Trimethylbenzene. |
| 17–22% | 1, 2, 3-Trimethylbenzene. |
| 22–27% | Tetramethylbenzene. |
| 27–37% | Naphthalenes. |
| 37–59% | Monomethylnaphthalenes. |
| 59–61% | Diphenyl. |
| 61–74% | Dimethylnaphthalenes. |
| 74–78% | Methyldiphenyls. |
| 78–83% | Trimethylnaphthalenes. |
| 83–87% | Fluorene. |
| 87–89% | Methylfluorenes. |
| 89–94% | Anthracene and Phenanthrene. |
| 94–97% | Methylanthracenes and Methylphenanthrenes. |
| 97–98% | Pyrene. |
| 98–100% | Tetracyclics and Higher. |

A representative hydroformer bottoms fraction exhibits the following physical properties:

API gravity ............................................. 11–22
Refractive index $n_D^{20}$ ......................... 1.5911
Specific dispersion ................................... 264
ASTM distillation:
  Initial ............................................. °F.. 448
  10% ............................................... °F.. 448
  20% ............................................... °F.. 465
  30% ............................................... °F.. 477
  40% ............................................... °F.. 484
  50% ............................................... °F.. 490
  60% ............................................... °F.. 501
  70% ............................................... °F.. 516
  80% ............................................... °F.. 545
  90% ............................................... °F.. 620
Max. (92% off) ...................................... °F.. 750

Either the entire hydroformer polymer or lower boiling fractions thereof, such as the 0 to 90% fraction boiling between about 400° F. and 600° F. or the 0 to 50% fraction boiling between about 400° F. and 500° F. may be used.

The alcohol employed in the present invention is an alkyl carbinol, such as for example, ethyl alcohol, propyl alcohol, isopropyl alcohol, butyl alcohol, and amyl alcohols, such as tertiary amyl alcohol. Higher alcohols of 9 to 16 carbon atoms and higher are not precluded; nonyl alcohol has been found to be operable.

As aforesaid, the source of sulfonic acids for the preparation of the metal sulfonates are the acid sludges resulting from the treatment of the hydrocarbon oil with concentrated or fuming sulfuric acid. In the preparation of highly refined petroleum oils of the type of insulating oils, turbine oils, technical white oils and mineral medicinal oils, in which the oils are treated successively with a number of portions of concentrated or fuming sulfuric acid, a variety of sulfur-containing compounds are formed by the chemical reactions, including sulfonic acids, organic esters of sulfuric acid, partial esters of sulfuric acid, etc. Many of these compounds are relatively insoluble in the oil under the treating conditions and separate from the oil together with unreacted sulfuric acid as a sludge which is separated from the oil after each incremental acid treatment or "dump." A substantial portion of the organic acids in the acid sludge are preferably water-soluble sulfonic acids, which possess a characteristic dark green color. In addition to the so-called green acids the acid sludges also contain other sulfonic acids, such as so-called brown acids and black acids. While we can use acid sludges obtained in the treatment of viscous hydrocarbon oils having a Saybolt Universal viscosity of from 80 seconds to 900 seconds at 100° F. with 0.5 to 9 pounds of fuming sulfuric acid per gallon of oil being treated, we prefer to use the acid sludges obtained in the treatment of hydrocarbon oils having a Saybolt Universal viscosity at 100° F. of from about 100 seconds to about 150 seconds with 2 to 4 pounds of fuming sulfuric acid per gallon of oil being treated.

The present invention will be described by the following specific examples which are given by way of illustration only and is not intended to limit the scope of the invention.

Example I

Acid sludges totaling 15,700 gallons resulting from the preparation of a technical white oil with 3 pounds of fuming sulfuric acid per gallon of oil was hydrolyzed by circulating hot, weak sulfuric acid of about 15% strength from the bottom to the top of a lead lined agitator, and introducing the sludge into the circulating line. The blended mix was then steamed, allowed to settle, and the weak sulfuric acid withdrawn.

The remaining portion of the sludge known as "liver," and amounting to about 12,700 gallons, was diluted with water to a volume of about 75,000 gallons, and a lime slurry of 9000 pounds slacked lime in 7000 gallons water was then pumped into the mixture while agitating the same. The amount of lime slurry used was slightly in excess of that required for the complete neutralization of the sulfonic acids present but insufficient to completely neutralize the total acidity. After all of the lime slurry was added the mixture was allowed to settle to form a bottom layer of calcium sulfonate and an upper layer of slightly acid water, which was withdrawn. After withdrawal of all of the water, about 19,000 gallons of catalytic cycle stock was added to the calcium sulfonate and the mixture was agitated with air and open steam. The excess acidity was then neutralized by the addition of 200 to 500 pounds of slacked lime in a water slurry after which the mixture was heated to a temperature of about 200–210° F. and air-blown to dehydrate to a water content of 2% to 3%. The dehydrated mixture was then cooled to 140° F., 1800 gallons of isopropyl alcohol added, and the mixture recycled to effect thorough mixing.

The final composition had the following components in the following approximate proportions:

| | Weight per cent |
|---|---|
| Calcium sulfonate | 28 |
| Catalytic cycle stock | 59 |
| Isopropyl alcohol | 4 |
| Oil | 4 |
| Water | 5 |

Example II

Acid sludge, from the treatment of a hydrocarbon oil, having a Saybolt Universal viscosity at 100° F. of 95–100 seconds, with three pounds of fuming sulfuric acid per gallon of oil, amounting to 17,600 gallons, was hydrolyzed by mixing the same with a weak sulfuric acid solution (7500 gallons of 35% sulfuric acid diluted with 7500 gallons of water) and heating the mixture with open steam. The hydrolyzed sludge was then settled and 21,500 gallons of weak acid drawn off, and 12,700 gallons of liver remaining was diluted with 66,000 gallons of water. The diluted liver was then treated with a lime slurry, containing 10,800 pounds of hydrated lime, and the calcium sulfonate precipitated. After drawing off the supernatant liquid, the soap solution containing about 45% calcium sulfonate and 35% water was mixed with 19,000 gallons of light catalytic cycle stock, and the diluted product treated with an additional 1000 pounds of lime in a water slurry to complete the neutralization.

The resultant mixture containing 35% water was dehydrated to a water content of about 4.7%, and the 29,000 gallons of dehydrated product mixed with 1800 gallons of isopropyl alcohol.

The finished composition contained about 27% calcium sulfonate, 60% catalytic cycle stock, 4% isopropyl alcohol, 5% water, and 4% oil.

The importance of diluting the hydrolyzed sludge liver with sufficient water to obtain a sulfonate having a low inorganic salt content is demonstrated by the following test and data:

A liver from acid sludge was divided into three portions and each portion treated as follows:

(1) One portion was diluted ten fold with water and sufficient lime added to react with the sulfonic acids to form calcium sulfonate. The precipitated calcium sulfonate was separated from the acidic top layer, and the sulfonate treated with additional lime to neutralize occluded weak acid, and dried.

(2) A second portion was treated as in (1) except that sufficient lime was added initially to form the calcium sulfonate and neutralize all sulfuric acid acidity.

(3) The third portion was diluted with one and a half (1.5) volumes of water instead of 10 volumes as in (1) and (2), and lime was added as in (2).

The three calcium sulfonate soaps were then analyzed with the following results:

| Sample | Percent Soap | Percent Oil | Percent Inorganic Salt |
|---|---|---|---|
| (1) | 45.1 | 51.6 | 3.3 |
| (2) | 44.8 | 50.1 | 5.1 |
| (3) | 38.0 | 37.7 | 24.3 |

The advantage of diluting with a large amount of water is apparent from the above data.

The sulfonate composition of the herein-described invention is especially well suited as an additive for oils and bituminous coating materials such as road oils, asphalts, etc. to promote adherence to wet mineral aggregates, and to prevent or reduce the tendency of such materials to stripping from mineral aggregates by water. The amount of the sulfonate composition to be used depends upon several factors, among which are the type of oil or bituminous materials employed, the area of the aggregate-bitumen interface, the characteristics of the aggregate material, the severity of the conditions of use, etc. It will be appreciated that these factors are interdependent to some extent, and that therefore the quantity of sulfonate composition which can be used most advantageously will be determined for the individual combination of bitumen and aggregate. In general the amount of sulfonate composition used to produce the best effects should be sufficient to produce a bitumen composition having from about 0.05% to about 10%, and preferably from about 0.5% to about 5%, of the 100% metal sulfonate, based upon the bitumen used. By way of illustration, about 40 gallons of the composition of Example II for each 1000 gallons of bitumen will give approximately 1% calcium sulfonate (100%) in the additive-containing road oil.

Percentages given herein and in the appended claims are weight percentages unless otherwise stated.

We claim:

1. The method of preparing a stable homogeneous polyvalent metal sulfonate composition, comprising diluting an acid sludge containing sulfonic acids resulting from the treatment of hydrocarbon oils with sulfuric acid of at least about 95% strength, and which has been substantially freed of unreacted sulfuric acid, with from about 3 to 10 volumes of water to each volume of said acid sludge, adding a sufficient amount of a basic polyvalent metal compound to neutralize the sulfonic acids contained in said acid sludge and precipitate the polyvalent metal sulfonates therefrom, removing the supernatant liquid from the precipitated polyvalent metal sulfonates, adding from about 25% to about 75% of a liquid aromatic hydrocarbon having a boiling point of at least about 220° F., reducing the water content of the mixture of polyvalent metal sulfonates and aromatic hydrocarbon to not more than about 35%, and adding to the dewatered mixture from about 2% to about 15% of an alkyl carbinol having from 2 to about 16 carbon atoms.

2. The method of claim 1, in which the aromatic hydrocarbon is an aromatic fraction boiling from about 400° F. to about 750° F., produced by the catalytic conversion of aliphatic hydrocarbons.

3. The method of claim 1 in which the aromatic hydrocarbon is a catalytic cycle stock fraction having a distillation range of between about 425° F. and about 560° F., and having an aromatic content of at least about 40 percent.

4. The method of claim 1 in which the alkyl carbinol is isopropyl alcohol.

5. The method of claim 1 in which the alkyl carbinol is nonyl alcohol.

6. The method of claim 1 in which the alkyl carbinol is tertiary amyl alcohol.

7. The method of claim 1 in which the basic compound is an alkaline earth basic compound.

8. The method of claim 1 in which the basic compound is calcium oxide.

9. The method of preparing a stable homogeneous calcium sulfonate composition, comprising diluting an acid sludge containing sulfonic acids, resulting from the treatment of hydrocarbon oils with sulfuric acid of at least about 95% strength, and which has been substantially freed of unreacted sulfuric acid, with from about 3 to 10 volumes of water for each volume of said acid sludge, adding a sufficient amount of a basic calcium compound to completely neutralize the sulfonic acids in said acid sludge and precipitate therefrom calcium sulfonates, but insufficient to completely neutralize the total acidity of said acid sludge, removing supernatant liquid from the precipitated calcium sulfonates, adding from about 25% to about 75% of a normally liquid catalytic cycle stock having an aromatic content of at least about 40% and having a distillation range between about 425° F. and about 560° F., adding additional basic calcium compound to completely neutralize the residual acidity of the mixture, reducing the water content of the mixture of calcium sulfonates and catalytic cycle stock to not more than about 35%, and adding to the dewatered mixture from about 2% to about 15% of an alkyl carbinol of from 2 carbon atoms to about 9 carbon atoms.

10. The method of claim 9 in which the basic calcium compound is a water slurry of slacked lime.

11. The method of claim 9 in which the alkyl carbinol is isopropyl alcohol.

12. The method of preparing a stable homogeneous calcium sulfonate composition comprising, treating sulfuric acid sludge, containing sulfonic acids and unreacted sulfuric acid, resulting from the treatment of hydrocarbon oils with 2½ to 6 pounds of fuming sulfuric acid per gallon of oil, to separate unreacted sulfuric acid from the acid sludge, diluting the treated acid sludge with from about 3 to 10 volumes of water for each volume of treated acid sludge, adding a sufficient amount of a lime slurry to neutralize the sulfonic acids in said treated acid sludge and precipitate therefrom calcium sulfonates but insufficient to completely neutralize the total acidity of said treated acid sludge, removing supernatant liquid from precipitated calcium sulfonates, adding from about 25% to about 75% of a catalytic cycle stock having an aromatic content of at least about 40%, and having a distillation range of from about 425° F. to about 560° F., adding additional lime slurry to completely neutralize the residual acidity of said mixture, reducing the water content of the mixture of calcium sulfonates and catalytic cycle stock to from about 3% to about 10%, and adding to the dewatered mixture from about 2% to about 15% isopropyl alcohol.

13. The composition comprised essentially of a bitumen and from about 0.5% to about 5% of a mixture consisting essentially of from about 10% to about 50% of a polyvalent metal sulfonate derived from sulfuric acid sludge resulting from the treatment of hydrocarbon oils with sulfuric acid of at least about 95% strength, from about 25% to about 75% of a liquid aromatic hydrocarbon having a boiling point above about 220° F., about 2% to about 15% of an alkyl carbinol having from 2 to about 16 carbon atoms, not more than 35% water, and up to about 30% oil other than said liquid aromatic hydrocarbon.

14. The composition comprising a bitumen hydrocarbon and from about 0.5% to about 5% of a mixture consisting essentially of from about 20% to about 30% calcium sulfonate derived from sulfuric acid sludge resulting from the treatment of hydrocarbon oils with sulfuric acid of at least about 95% strength, from about 35% to about 60% of a liquid solvent having a boiling point above about 220° F. and an aromatic content of at least about 40%, and from about 4% to about 8% of an alkyl carbinol having from 2 to about 16 carbon atoms, not more than about 35% water and from about 5% to about 10% hydrocarbon oil other than said liquid solvent.

15. The composition of claim 14 in which the solvent is a catalytic cycle stock having an aromatic content of at least about 40% and a distillation range between about 425° F. to about 560° F.

16. The composition of claim 14 in which the solvent is a bottoms fraction of a catalytically reformed gasoline, said bottoms having a distillation range of from about 400° F. to about 750° F.

17. The composition of claim 14 in which the alkyl carbinol is isopropyl alcohol.

18. The composition of claim 14 in which the bitumen is a normally liquid petroleum oil residuum.

DAVID W. BRANSKY.
JOHN A. BOLT.
MAURICE W. STACY.
MORRIS FELLER.

References Cited in the file of this patent
UNITED STATES PATENTS

| Number | Name | Date |
|---|---|---|
| 1,301,662 | Divine | Apr. 22, 1919 |
| 1,695,197 | Merrill | Dec. 11, 1928 |
| 2,151,147 | Piotrowski et al. | Mar. 21, 1939 |
| 2,278,954 | Thurston | Apr. 7, 1942 |
| 2,339,853 | Hemmer | Jan. 25, 1944 |
| 2,368,452 | Dawson | Jan. 30, 1945 |
| 2,395,713 | Barbour | Feb. 26, 1946 |
| 2,451,549 | Gzemski | Oct. 19, 1948 |
| 2,479,202 | Bransky et al. | Aug. 16, 1949 |
| 2,509,863 | Harlan | May 30, 1950 |

OTHER REFERENCES

Patterson, Jour. Am. Chem. Soc. 55 (1933), 3905–15.

Abstract of the American Chem. Soc. 4th Decennial index, page 3794.

Whitmore, "Organic Chemistry," 2nd ed., pp. 730, 877.